United States Patent
Lee (10) Patent No.: US 11,467,260 B2
(45) Date of Patent: Oct. 11, 2022

(54) HERMETICALLY SEALED DISTANCE MEASURING APPARATUS

(71) Applicant: Namuga, Co., Ltd., Gyeonggi-do (KR)

(72) Inventor: Jun Youb Lee, Gyeonggi-do (KR)

(73) Assignee: NAMUGA CO., LTD., Gyeonggi-do (KR)

( * ) Notice: Subject to any disclaimer, the term of this patent is extended or adjusted under 35 U.S.C. 154(b) by 539 days.

(21) Appl. No.: 16/695,277

(22) Filed: Nov. 26, 2019

(65) Prior Publication Data

US 2020/0284878 A1    Sep. 10, 2020

(30) Foreign Application Priority Data

Mar. 6, 2019 (KR) .................. 10-2019-0025674
Oct. 30, 2019 (KR) .................. 10-2019-0136566

(51) Int. Cl.
| | |
|---|---|
| G01S 7/481 | (2006.01) |
| G02B 7/02 | (2021.01) |
| G01S 17/10 | (2020.01) |
| G01S 7/497 | (2006.01) |
| G02B 5/20 | (2006.01) |

(52) U.S. Cl.
CPC ............ G01S 7/4813 (2013.01); G01S 7/497 (2013.01); G01S 17/10 (2013.01); G02B 5/208 (2013.01); G02B 7/022 (2013.01)

(58) Field of Classification Search
CPC ........ G01S 7/4813; G01S 7/497; G01S 17/10; G02B 5/208; G02B 7/022
See application file for complete search history.

(56) References Cited

U.S. PATENT DOCUMENTS

| | | | |
|---|---|---|---|
| 2016/0290620 A1* | 10/2016 | Ichikawa ............ | H01S 5/02407 |
| 2019/0131767 A1* | 5/2019 | Lee ..................... | H01S 5/02345 |
| 2019/0146069 A1 | 5/2019 | Etschmaier et al. | |
| 2019/0146319 A1 | 5/2019 | Stapleton et al. | |
| 2019/0148908 A1* | 5/2019 | Halbritter ........... | H01S 5/02255 |
| | | | 372/43.01 |
| 2019/0296522 A1* | 9/2019 | Johnson ............. | H01S 5/02253 |

* cited by examiner

*Primary Examiner* — David P Porta
*Assistant Examiner* — Fani Polyzos Boosalis
(74) *Attorney, Agent, or Firm* — FisherBroyles, LLP; Susan M. Oiler (57) ABSTRACT

A distance measuring apparatus has a substrate supporting, on a first surface thereof, a light source that emits light and a first optical element that decreases the intensity of the emitted light, and a processor on a second surface opposite the first surface. A light receiving element and a second optical element, which is at a higher position than the light receiving element, both receive the emitted light after reflecting from an object. A frame is connected to the substrate and spaces the first optical element and the second optical element a predetermined distance apart from the light source and the light receiving element, and a partition is disposed between the light source and the light receiving element, thereby defining a first cavity housing the light source and a second cavity housing the light receiving element. The processor is electrically connected to the light source and controls the light source.

19 Claims, 9 Drawing Sheets

HERMETICALLY SEALED DISTANCE MEASURING APPARATUS

CROSS REFERENCE TO RELATED APPLICATION

This application claims the priority to Korean Patent Application No. 10-2019-0025674, filed Mar. 6, 2019, and Korean Patent Application No. 10-2019-0136566, filed Oct. 30, 2019, which are both hereby incorporated by reference for all purposes as if fully set forth herein.

BACKGROUND OF THE INVENTION

1. Field of the Invention

The present disclosure relates to a distance measuring apparatus.

2. Description of the Prior Art

A laser is originated as an acronym for "light amplification by stimulated emission of radiation", and can emit a light having high coherence. Also, the laser can emit a single color of light with directionality, which allows the laser to be used in various fields of optical sensor technology.

For example, the laser can be utilized as a light source for a distance measuring apparatus, as well as a light source for a 3D depth camera. A distance measuring apparatus of a Time-of-Flight (ToF) type calculates a time of flight between a light source and an object, based on a phase difference between a pulsed light outputted from the light source and its return to the light source, to measure a distance based on the phase difference and frequency information. A distance measuring apparatus of a structured light or hybrid stereo type may employ a laser as a light source and form regular or irregular patterns by a diffuser to extract distance information.

The laser is used as a light source for a distance measuring apparatus and a 3D depth camera in view of characteristics of high output power and directionality.

The high output power of the laser increases a distance of flight of the light, and also maintains the output of the returned light at a constant level. However, the laser is recognized as being potentially dangerous. In the case where the light having high output power hits a human eye directly, it results in damage to the eye, or the eye may be blinded in extreme cases. Accordingly, a safety should be considered in the case of utilizing the laser as a light source.

Lasers are usually labeled with a safety class in some countries, and the intensity of the beam outputted from the apparatus is restricted depending upon application of each class.

One of methods for controlling the intensity of light emitted from the laser employs a diffuser which is disposed on an output path of the light to reduce the luminous intensity of the light. Since the diffuser diffuses the focused light at a predetermined field of view which is required for a system, by use of refraction and diffraction which are properties of light, the luminous intensity of the light passing through the diffuser is decreased by unit area.

In the case where the diffuser is detached from an apparatus for controlling the intensity of the light with the diffuser, a problem is raised since the high-powered light is outputted intact.

Also, in the case of the light source for outputting the laser, its output is generally controlled by a laser diode driver. However, there is a problem in that since a physical distance between the laser diode driver and the light source results in data loss, increased impedance, and increased power consumption, and it makes precise data transmission between the light source and the laser diode driver difficult.

Accordingly, there is required for a distance measuring apparatus, in which the physical distance between the laser diode driver and the light source is minimize to decrease the data loss between the light source and the laser diode driver, and achieve the precise data transmission therebetween, and in which, because of the minimized physical distance, the problem can be quickly solved to protect eyes, even though the light source or module is not normal or is damaged.

SUMMARY OF THE INVENTION

Therefore, one object of the present disclosure is to provide a distance measuring apparatus capable of providing an eye-safety function.

Another object of the present disclosure is to provide a distance measuring apparatus which can minimize a physical distance between a light source for outputting a light and a processor for controlling the light source to achieve precise data transmission therebetween.

In order to achieve the above objects, according to one aspect of the present disclosure, there is provided a distance measuring apparatus including: a light source configured to emit a light; a first optical element configured to decrease intensity of the light emitted from the light source, through which the light emitted from the light source penetrates; a light receiving element configured to receive the light which is emitted from the light source toward a predetermined space and then reflected back from an object; a substrate configured to support the light source and the light receiving element; a second optical element which is disposed in a higher position than that of the light receiving element to collect the light reflected back from the object and through which the light is reflected back from the object penetrates; a frame which is disposed to be connected to the substrate, and spaces the first optical element and the second optical element apart from the light source and the light receiving element by a predetermined distance; a partition which is disposed between the light source and the light receiving element to form a first cavity on a side of the light source and a second cavity on a side of the light receiving element in cooperation with the frame; and a processor, configured to monitor and control an output of the light source, which is disposed on a surface of the substrate opposite the surface on which the light source is disposed and electrically connected to the light source via the substrate.

Preferably, the processor operates an eye-safety mode to restrict the output of the light source, if an output value of the light source deviates from a reference level.

Preferably, the distance measuring apparatus further includes a photosensitive element which is disposed on the substrate to measure the luminous intensity of the light reflected by the first optical element.

Preferably, if the light measured by the photosensitive element deviates from a predetermined level, the processor operates an eye-safety mode to restrict the output of the light source.

Preferably, the substrate includes a first substrate and a second substrate, the light source and the processor are disposed on the first substrate, and the light receiving element is disposed on the second substrate.

Preferably, the frame, the partition, and the substrate comprise ceramic.

Preferably, the ceramic is a low temperature co-fired ceramic.

Preferably, the processor is electrically connected to the light source through a via-fill formed inside the substrate.

Preferably, an inner surface of the frame and an outer surface of the partition are provided with a metallic ground.

Preferably, the second optical element includes an infrared filter.

Preferably, the light source includes a vertical-cavity surface-emitting layer (VCSEL), and the first optical element includes a diffuser for diffusing the light.

According to another aspect of the present disclosure, there is provided a distance measuring apparatus including: a light source configured to emit a light; a first optical element configured to decrease intensity of the light emitted from the light source, through which the light emitted from the light source penetrates; a light receiving element configured to receive the light emitted from the light source toward a predetermined space and reflected back from an object; a second optical element which is disposed in a higher position than that of the light receiving element to collect the light reflected back from the object and through which the light is reflected back from the object penetrates; a structure configured to space the first optical element from the light source and the second optical element apart from the light receiving element by a predetermined distance, to support these elements, and to form a first cavity on a side of the light source and a second cavity on a side of the light receiving element so as to space the light source and the light receiving element from each other by a predetermined distance; and a processor, configured to monitor and control an output of the light source, which is disposed on a surface of the substrate opposite the surface on which the light source is disposed and electrically connected to the light source via the substrate.

Preferably, the processor operates an eye-safety mode to restrict the output of the light source, if an output value of the light source deviates from a reference level.

Preferably, the distance measuring apparatus further includes a photosensitive element which is disposed on the substrate to measure the luminous intensity of the light reflected by the first optical element.

Preferably, if the light measured by the photosensitive element deviates from a predetermined level, the processor operates an eye-safety mode to restrict the output of the light source.

Preferably, the structure comprises ceramic.

Preferably, the ceramic is a low temperature co-fired ceramic.

Preferably, the processor is electrically connected to the light source through a via-fill formed inside the structure.

Preferably, an inner surface of the structure is provided with a metallic ground.

With the configuration of the distance measuring apparatus described above, even though the distance measuring apparatus does not operate in a normal mode or is damaged, it is possible to protect the user's eye.

In addition, it is possible to decrease data loss between the light source and the processor, which achieves precise data transmission, and reduce power consumption.

DETAILED DESCRIPTION OF THE PREFERRED EMBODIMENT

Hereinafter, some embodiments of the present disclosure will be described in detail with reference to the accompanying drawings. In adding reference numerals to elements in each drawing, the same elements will be designated by the same reference numerals as far as possible, although they are shown in different drawings. Further, in the following description of the present disclosure, a detailed description of known functions and configurations incorporated herein will be omitted when it is determined that the description may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence or the like of a corresponding structural element are not limited by the term. When it is described in the specification that one component is "connected," "coupled" or "joined" to another component, it should be read that the first component may be directly connected, coupled or joined to the second component, but also a third component may be "connected," "coupled," and "joined" between the first and second components.

Figure 1:
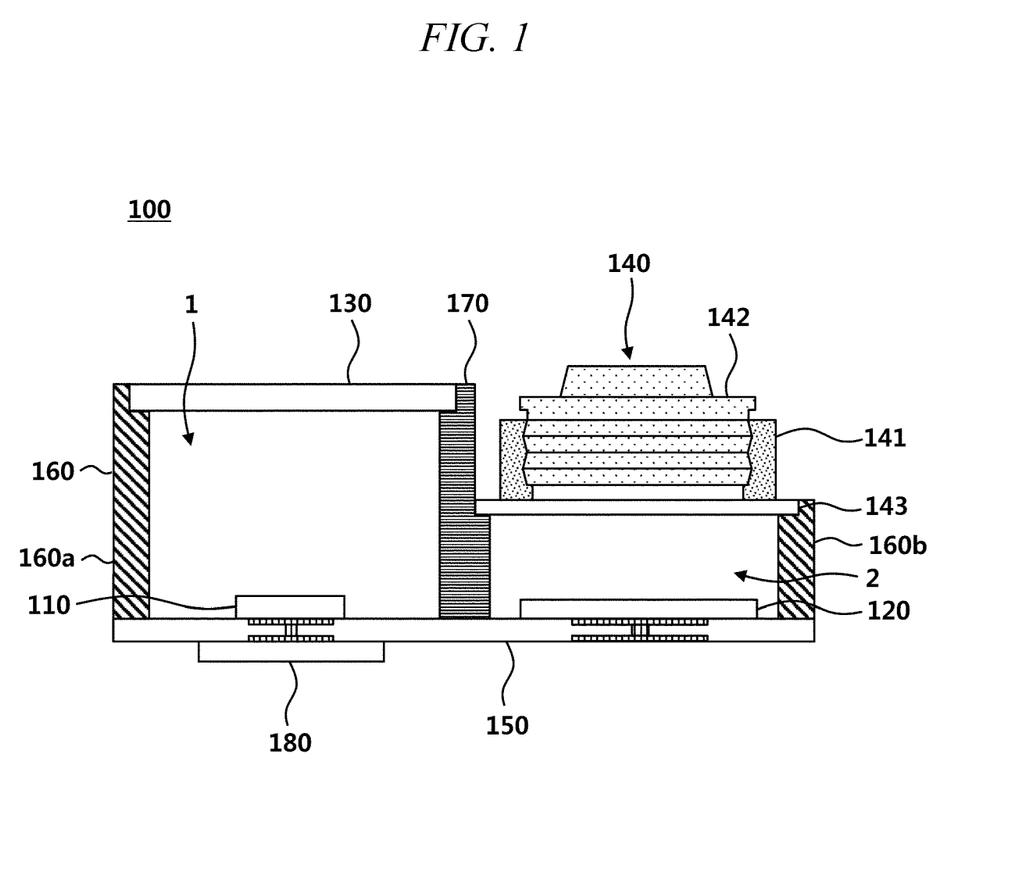
FIG. 1 is a cross-sectional view of a distance measuring apparatus according to the first embodiment of the present disclosure.

FIG. 1 is a cross-sectional view of a distance measuring apparatus according to the first embodiment of the present disclosure.

Referring to FIG. 1, a distance measuring apparatus 100 according to the first embodiment generally includes a light source 110, a light receiving element 120, a first optical element 130, a second optical element 140, a substrate 150, a frame 160, a partition 170, and a processor 180.

The light source 110 is disposed on the substrate 150 to emit a light. The light source 110 has an anode electrode electrically connected to an anode wire of the substrate, and a cathode electrode electrically connected to a cathode wire of the substrate.

The light source 110 is connected to the substrate 150 by wire bonding. Alternatively, the light source 110 may be disposed on the substrate 150 by a flip chip bonding method, without using a wire. In the case where the light source 110 is connected to the substrate 150 by the flip chip bonding method, a wire is not needed, and thus the distance measuring apparatus can be downsized.

The present disclosure is not limited to a specific configuration of the light source 110 if the light source can emit a light, such as laser. Preferably, the light source 110 may include a vertical-cavity surface-emitting laser (VCSEL).

The light receiving element 120 is disposed on the substrate 150 to receive the light which is emitted from the light source 110 and is returned from an object. The light receiving element 120 has an anode electrode electrically connected to an anode wire of the substrate, and a cathode electrode electrically connected to a cathode wire of the substrate.

The light receiving element 120 is connected to the substrate 150 by wire bonding. Alternatively, the light receiving element 120 may be disposed on the substrate 150 by a flip chip bonding method, without using a wire. In the case where the receiving element 120 is connected to the substrate 150 by the flip chip bonding method, a wire is not required, and thus the distance measuring apparatus can be downsized.

If the light receiving element 120 is configured to receive the reflected light and form an image based on the received light, the present disclosure is not limited to its configuration. The light receiving element 120 may be an image sensor, such as a charge-coupled device (CCD), and a CMOS image sensor.

The light receiving element 120 receives the light reflected by the object to calculate the distance between the distance measuring apparatus 100 and the object. For example, a distance measuring apparatus of a time-of-flight (ToF) type measures a travel time of the light emitted from the light source and returned from the object to calculate the distance between the light source and the object based on the measured time. A distance measuring apparatus of a structured light type analyzes the pattern of the light which is returned from the object and is received by the light receiving element, to measure the distance between the light source and the object.

The first optical element 130 is to decrease the intensity of the light emitted from the light source 110 toward a predetermined space, through which the light penetrates. For example, the first optical element 130 diffuses the light to widen an arrival area of the light, thereby decreasing the intensity of the light supplied to a unit area.

If the first optical element 130 is configured to decrease the intensity of the light by diffusing the light, the present disclosure is not limited to its configuration. The light receiving element 120 may include a diffraction optical element (DOE) or a combination thereof.

The second optical element 140 is to collect the light outputted toward a predetermined space from the light source 110 and returned back from the object, through which the light returned from the object penetrates. For example, the second optical element 140 may include at least one lens for collecting the light returned from the object, so that the light receiving element 120 receives the light passing the lens.

The second optical element 140 may include a lens frame 141, a lens 142, and a transparent substrate 143.

The lens frame 141 supports the lens 142. The lens frame 141 is provided with a threaded portion, and the lens 142 is fastened to the threaded portion and thus is supported by the lens frame 141. In the case where the lens frame 141 is provided with the threaded portion, it is possible to fix the lens 142 to the lens frame 141 while the height of the lens 142 is adjusting. Accordingly, the height of the lens 142 can be easily adjusted in the fixing process, thereby easily and accurately aligning the focus of the light receiving element 120.

Alternatively, the lens frame 141 may not be provided with the threaded portion, but the lens 142 may be engaged to the lens frame 141 by a bonding method.

The light collected by the lens 142 passes through the transparent substrate 143. An optical filter (not illustrated) for selectively allowing only a light of a specific wavelength to pass may be disposed on the transparent substrate 143. The optical filter may be an infrared filter. For example, the infrared filter is disposed on the transparent substrate 143, and in the case where the light emitted from the light source 110 is reflected by the object, and then the light of an infrared wavelength enters the distance measuring apparatus, the transparent substrate 143 selectively passes only the light of the infrared wavelength, thereby reducing a noise which can be generated in the light receiving element 120 by a light of other wavelengths, and improving resolution of the distance measuring apparatus.

The substrate 150 can support the light source 110 and the light receiving element 120. The substrate 150 may be patterned with wiring. The substrate 150 is supplied with electricity from the exterior, and supplies the electricity to the light source 110 and the light receiving element 120 via the wiring. The substrate 150 may be formed of a multi-layered structure, and may include ceramic, but the present disclosure is not limited to components. The ceramic may be a low temperature co-fired ceramic (LTCC).

If the substrate 150 comprises ceramic, heat generated from the light source 110 and the light receiving element 120 can be effectively radiated to the outside, since the ceramic material has a good heat dissipating function.

Also, if the substrate 150 comprises ceramic, the substrate 150 is formed by depositing ceramic layers, and a pattern may be formed on each layer of the substrate 150 at deposition, if necessary. Accordingly, the light source 110, the light receiving element 120, the processor 180, and a photosensitive element are electrically connected to each other via the pattern which is formed inside the substrate.

The frame 160 is disposed to be connected with the substrate 150, and the first optical element 130 and the second optical element 140 are spaced apart from the light receiving element 120 and the light source 110 at a predetermined interval. The frame 160 supports the first optical element 130 and the second optical element 140.

The frame 160 includes a frame 160a for forming a first cavity 1 on a side of the light source 110 and a frame 160b for forming a second cavity 2 on a side of the light receiving element 120, in which the frame 160b is formed to be lower than the frame 160a. Since the heights of the frames 160a and 160b are different from each other, the height of the first optical element 130 is higher than that of the second optical element 140. In the case where the height of the frame on the light source 110 is higher than that of the frame on the light receiving element 120, it is possible to block a path, along which the light emitted from the light source 110 directly enters the light receiving element, thereby preventing the light emitted from the light source 110 from entering the second cavity 2, without being reflected back from an object.

The partition 170 is disposed between the light source 110 and the light receiving element 120 to form the first cavity 1 on the side of the light source 110 and the second cavity 2 on the side of the light receiving element 120 in cooperation with the frame 160. The light source 110 is disposed in the first cavity 1 formed by the partition 170, and the light receiving element 120 is disposed in the second cavity 2.

The partition 170 prevents the light emitted from the light source 110 from directly entering the second cavity 2 which houses the light receiving element 120 therein, without being reflected back from the object. In order to more effectively block the light emitted from the light source 110 from entering the second cavity 2, a light blocking film may be disposed on an outer surface of the partition 170.

Similar to the substrate 150, the frame 160 and the partition 170 may include ceramic, and the ceramic may be a low temperature co-fired ceramic (LTCC).

If the frame 160 and the partition 170 comprise ceramic, the heat generated from the light source 110 and the light receiving element 120 can be effectively radiated to the outside. The frame 160 and the partition 170 may be formed by depositing ceramic layers, and a pattern may be formed on each layer at deposition, if necessary.

The supply of the electricity to the light source 110 is monitored or controlled by the processor 180, and the processor 180 can control the electricity to be supplied to the light source 110, respectively, depending upon a normal mode and an eye-safety mode. For example, the processor 180 operates to supply the electricity to the light source 110 only in the normal mode, but not to supply the electricity to the light source 110 in the eye-safety mode. Alternatively, the processor 180 may operate to supply the light source with the relatively low electricity in the eye-safety mode, in comparison with the normal mode.

The processor 180 monitors the output of the light source 110, and if an output value of the light source 110 deviates from a reference level, the processor operates the eye-safety mode to restrict the output of the light source and thus protect user's eyes.

The processor 180 is disposed on a bottom surface of the substrate 150 opposite to the light source 110, and is electrically connected to the light source 110 via the wiring of the substrate 150. Meanwhile, in the case where the substrate 150 comprises ceramic, the processor 180 is electrically connected to the light source 110 via the pattern formed on each layer formed inside the substrate 150.

The structure, of which the processor 180 is disposed on the bottom surface of the substrate 150 opposite to the light source 110, leads to the decreased physical distance to connect the light source 110 and the processor 180, as compared with a structure in which the processor 180 is disposed on the substrate 150 on the same surface of the light source 110, or the processor 180 is disposed at the outside of the first cavity 1. As the physical distance between the light source 110 and the processor 180 is decreased, a length of the wiring or pattern for electrically connecting the light source 110 and the processor 180 is shortened, and thus data transmission between the light source 110 and the processor 180 which send or receive a pulsed signal of a nanoscale unit can be quickly and precisely performed. Therefore, it is possible to reduce a data loss and noise at the data transmission, and electrical energy used for the light source 110 and the processor 180 can be decreased.

As the processor 180 is disposed on the bottom surface of the substrate 150 opposite to the light source 110, the light source 110 and the processor 180 may be effectively arranged in the space within the distance measuring module, thereby decreasing a volume of the distance measuring apparatus and thus downsizing the module.

A metallic ground may be provided on the outer surfaces of the frame 150 and the partition 170. The metallic ground shields electromagnetic interference caused by electromagnetic waves generated from the exterior of the distance measuring module 100. Accordingly, it is possible to prevent the electromagnetic interference from affecting the light source 110, the light receiving element 120, and the processor 180 in the distance measuring apparatus, thereby improving the reliability of the distance measuring apparatus 100.

Figure 2:
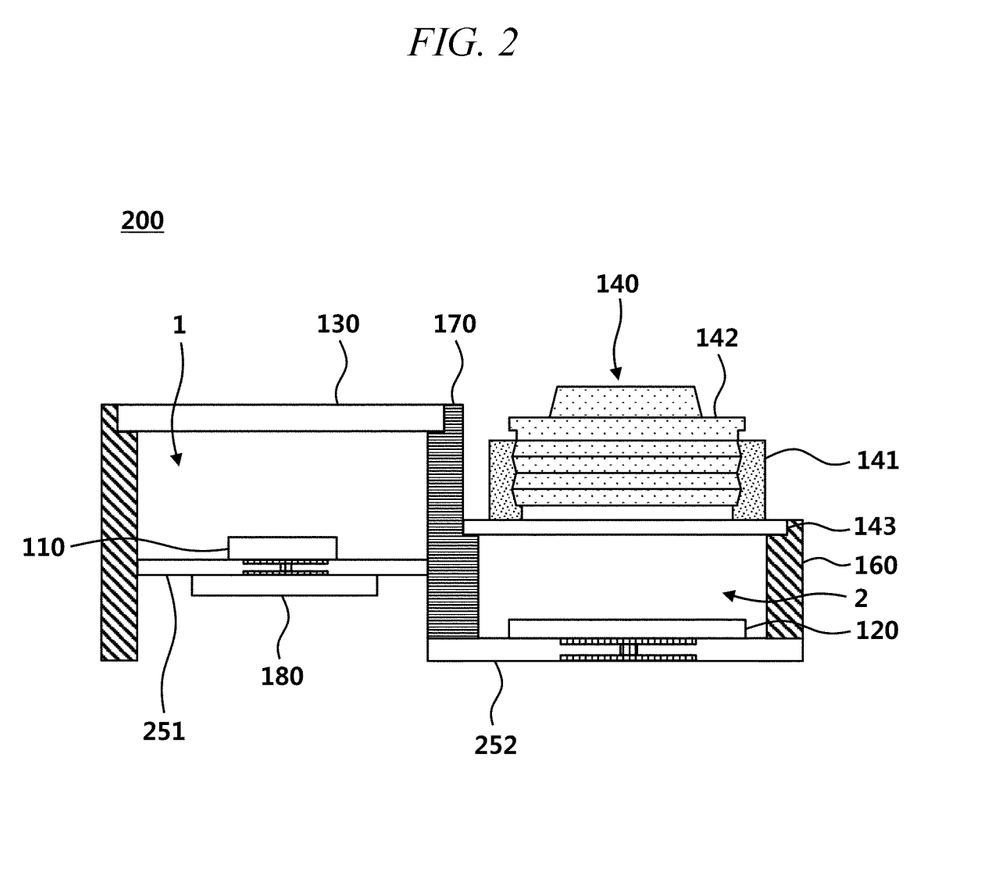
FIG. 2 is a cross-sectional view of a distance measuring apparatus according to the second embodiment of the present disclosure.

FIG. 2 is a cross-sectional view of a distance measuring apparatus according to the second embodiment of the present disclosure.

Referring to FIG. 2, a distance measuring apparatus 200 according to the second embodiment generally includes a light source 110, a light receiving element 120, a first optical element 130, a second optical element 140, a first substrate 251, a second substrate 252, a partition 170, and a processor 180.

The light source 110 is disposed on the first substrate 251, and the light receiving element 120 is disposed on the second substrate 252. The first substrate 251 is supported by the frame 160 and the partition 170 at the height difference between the first optical element 130 and the second substrate 252.

As illustrated in FIG. 2, in the case where the substrate of the distance measuring apparatus 200 is divided into the first substrate 251 and the second substrate 252, even though the processor 180 is disposed on the first substrate 251 opposite to the light source 110, the processor 180 is partially protected by the frame 160. Since the processor 180 is not exposed to the outside of the distance measuring apparatus 200, the processor can be protected against external shock or pollutant source. The light source 110 and the processor 180 are disposed inside the distance measuring apparatus 200, thereby reducing the volume of the distance measuring apparatus 200.

The first substrate 251 and the second substrate 252 are electrically connected to each other via the wiring formed in the partition 170. Accordingly, the light source 110 is electrically connected to the light receiving element 120 via the wiring formed in the first substrate 251, the wiring formed in the partition 170, and the wiring formed in the second substrate 252, and thus can transmit or receive a signal to or from the light receiving element 120.

The first substrate 251, the second substrate 252, the partition 170, and the frame 160 comprise ceramic, and the ceramic may be a low temperature co-fired ceramic (LTCC). The first substrate 251, the second substrate 252 and the partition 170 may be formed by depositing ceramic layers. In the case where the first substrate 251, the second substrate 252 and the partition 170 comprise ceramic, the light source 110 and the light receiving element 120 are electrically connected to each other via the patterns formed in the first substrate 251, the second substrate 252, and the partition 170.

Figure 3:
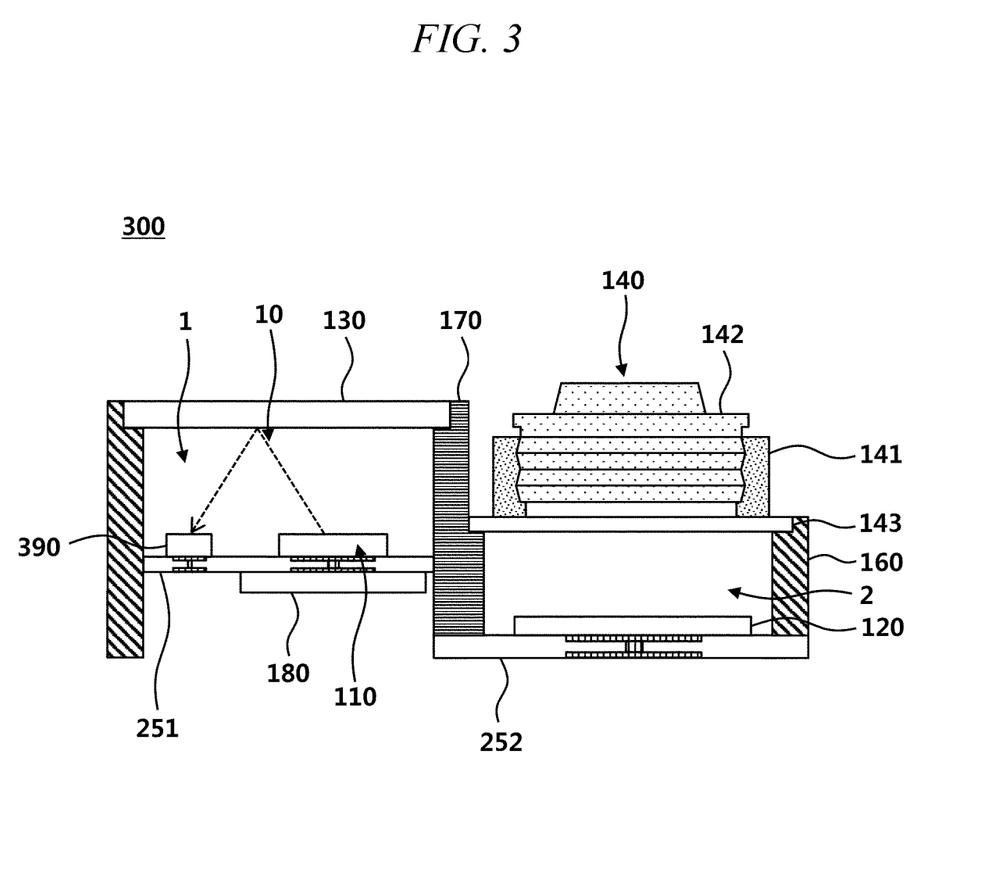
FIG. 3 is a cross-sectional view of a distance measuring apparatus according to the third embodiment of the present disclosure.

FIG. 3 is a cross-sectional view of a distance measuring apparatus according to the third embodiment of the present disclosure.

Referring to FIG. 3, a distance measuring apparatus 300 according to the third embodiment generally includes a light source 110, a light receiving element 120, a first optical element 130, a second optical element 140, a first substrate 251, a second substrate 252, a partition 170, a processor 180, and a photosensitive element 390.

Figure 4:
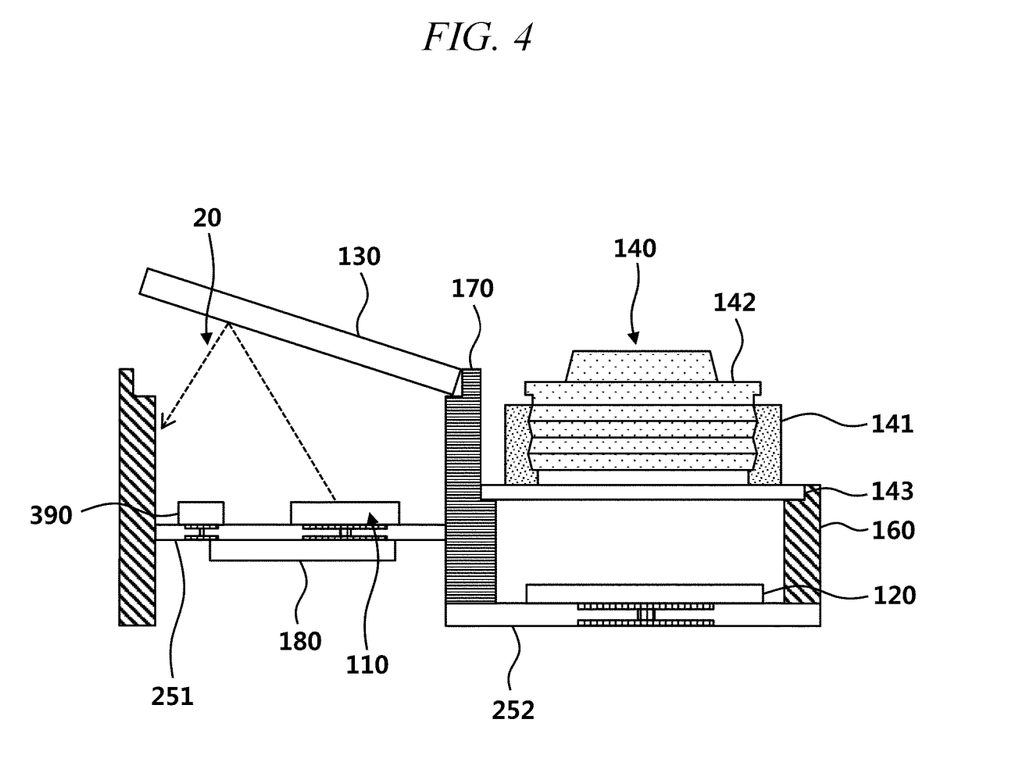
FIG. 4 is a cross-sectional view illustrating the case where the distance measuring apparatus according to the third embodiment of the present disclosure is not normal.

The photosensitive element 390 is disposed on the first substrate 251 to measure the luminous intensity of the light partially reflected by the first optical element 130. Although FIGS. 3 and 4 show the photosensitive element 390 which is disposed on the first substrate 251, the present disclosure is not limited thereto. For example, the photosensitive element may be disposed on the substrate 150 of the distance measuring apparatus 100 according to the first embodiment.

The photosensitive element 390 is not limited to its configuration if it can measure the light reflected by the first optical element 130. Preferably, the photosensitive element is a photodiode.

The light emitted from the light source 110 is reflected by the first optical element 130, and the reflected light enters the photosensitive element 390 (see a reference numeral 10 in FIG. 3). In this instance, the photosensitive element 390 measures the luminous intensity of the incident light to send the luminous intensity value to the processor 180. The processor 180 determines whether or not the luminous intensity value deviates from a predetermined range, and if it is deviates from the predetermined range, the processor operates the eye-safety mode to restrict the output of the light source 110 and thus protect the user's eyes.

Specifically, in the case where the luminous intensity of the light emitted from the light source 110 is higher than a safety level due to the abnormal light source 110, a part of the light emitted from the light source 110 is reflected by the first optical element 130, so that the luminous intensity of the reflected light may be higher than the predetermined level. In this instance, the photosensitive element 390 measures the luminous intensity of the reflected light to send the luminous intensity value to the processor 180. The processor 180 determines whether or not the luminous intensity value deviates from a predetermined range, and operates the eye-safety mode to restrict the output of the light source 110.

FIG. 4 is a cross-sectional view illustrating the case where the distance measuring apparatus according to the third embodiment of the present disclosure is not normal.

Referring to FIG. 4, the first optical element 251 may be spaced apart from the frame 160 and the partition 170 due to impact applied from the exterior of the distance measuring apparatus according to the third embodiment.

If the first optical element 130 deviates from a normal position, the light emitted from the light source 110 arrives at the user's eye in a state in which the luminous intensity of the light is not decreased, which may cause a damage to the eye. As the first optical element 130 deviates from the normal position, the path of the light emitted from the light source 110 and reflected back from the first optical element 130 may be changed. Accordingly, the quantity of the light entering the photosensitive element 390 may be decreased. In other words, if the first optical element 390 is not normal or is damaged, the luminous intensity of the light measured by the photosensitive element 390 is lower than that in the case where the first optical element 130 is positioned at the normal position, and thus the luminous intensity is lower than the predetermined level. If the luminous intensity of the light measured by the photosensitive element 390 is lower than the predetermined luminous intensity, the processor 180 operates the eye-safety mode to restrict the output of the light source 110 to protect the user's eyes.

Accordingly, with the above configuration of the distance measuring apparatus according to these embodiments, in the case where the light source 110 is damaged to output the light higher than the predetermined luminous intensity, or the first optical element 130 deviates from the normal position so that the luminous intensity of the outputted light is not decreased, the processor 180 operates the eye-safety mode to protect the user's eyes.

The processor 180 is disposed on the substrate 251 opposite to the photosensitive element 390, and is electrically connected to the photosensitive element 390 via the substrate 251, which reduces the distance between the photosensitive element 390 and the processor 180. Accordingly, the electrically connecting distance between the photosensitive element 390 and the processor 180 is shortened to precisely transfer the data and thus decrease the loss and noise at the data transmission.

Figure 5:
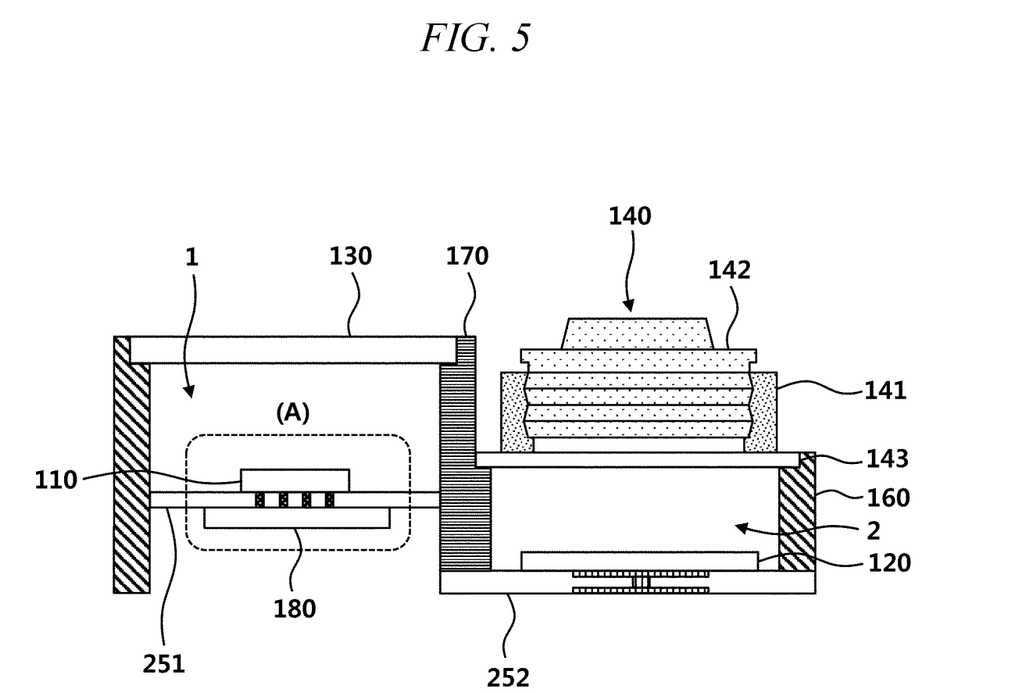
FIG. 5 is a view illustrating a via-fill formed on a substrate of the distance measuring apparatus according to the embodiment of the present disclosure.

FIG. 5 is a view illustrating a via-fill formed on a substrate of the distance measuring apparatus according to the embodiment of the present disclosure.

Figure 6:
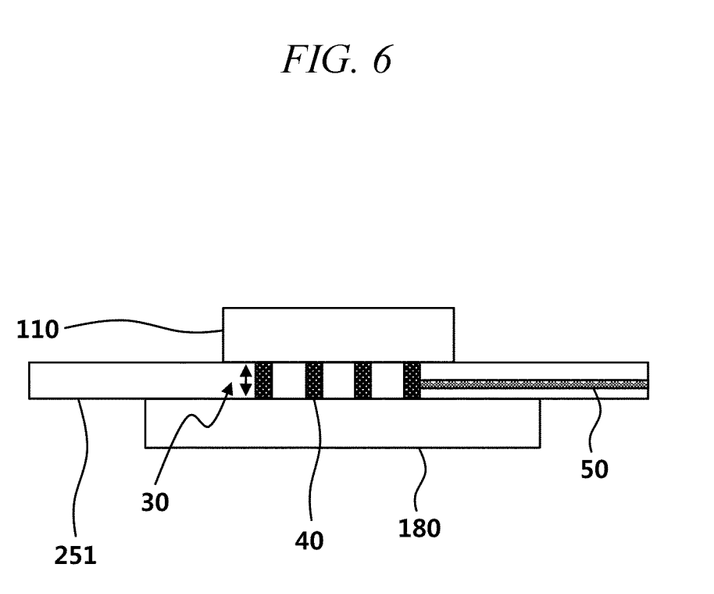
FIG. 6 is a partially enlarged view of the portion A in FIG. 5.

FIG. 6 is a partially enlarged view of the portion A in FIG. 5.

Referring to FIGS. 5 and 6, the processor 180 is disposed on the first substrate 251 opposite to the light source 110, and is electrically connected to the light source through a via-fill 40 formed in the first substrate 251.

The via-fill 40 is not limited to a specific material if the material has electrical conductivity. Preferably, the via-fill contains copper, nickel, gold or a combination thereof.

In the case where the light source 110 and the processor 180 are electrically connected to each other through the via-fill 40 formed in the first substrate 251, the data can be transmitted or received through the via-fill 40 (see a reference numeral 30 in FIG. 6), and the physical distance for connecting the light source 110 and the processor 180 can be further shortened. Accordingly, the electric resistance between the light source 110 and the processor 180 is lowered, which achieves precise data transmission.

Figure 7:
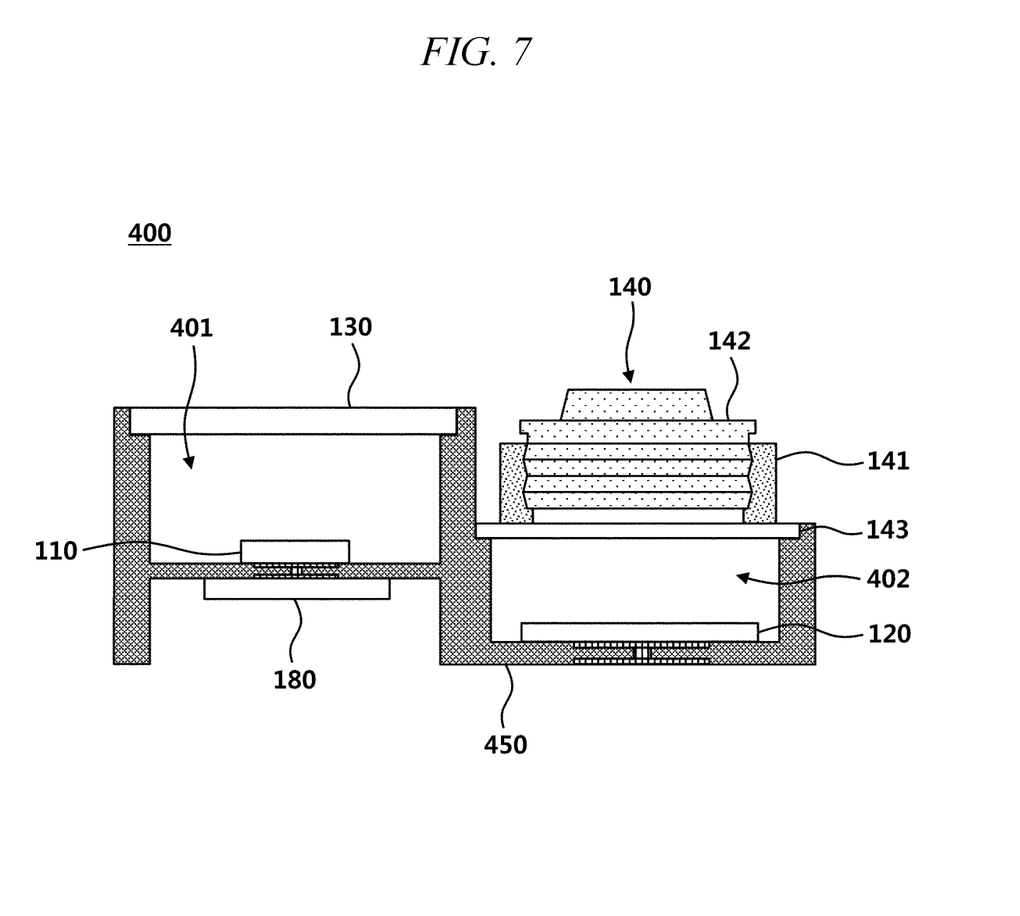
FIG. 7 is a cross-sectional view of a distance measuring apparatus according to the fourth embodiment of the present disclosure.

FIG. 7 is a cross-sectional view of a distance measuring apparatus according to the fourth embodiment of the present disclosure.

Referring to FIG. 7, a distance measuring apparatus 400 according to the fourth embodiment generally includes a light source 110, a light receiving element 120, a first optical element 130, a second optical element 140, a structure 450, and a processor 180.

The structure 450 supports the first optical element 130 and the second optical element 140, with the first optical element 130 and the second optical element 140 being away from the light source 110 and the light receiving element 120 at a predetermined distance, and forms a first cavity 401 on a side of the light source 110 and a second cavity 402 on a side of the light receiving element 120 to space the light source 110 and the light receiving element 120 apart from each other by a predetermined distance.

The structure 450 may comprise ceramic, and if the structure comprises ceramic, the heat generated from the light source 110 and the light receiving element 120 can be effectively radiated to the outside.

The structure 450 may be formed by depositing ceramic layers, and a pattern may be formed on each layer of the structure at deposition, if necessary. Accordingly, the light source 110, the light receiving element 120, and the processor 180 are electrically connected to each other via the pattern which is formed in the structure.

A metallic ground may be provided on the outer surface of the structure 450. The metallic ground shields electromagnetic interference caused by electromagnetic waves generated from the exterior of the distance measuring module. Accordingly, it is possible to prevent the electromagnetic interference from affecting the light source 110, the light receiving element 120, and the processor 180 in the distance measuring apparatus, thereby improving the reliability of the distance measuring apparatus 400.

In the case where the distance measuring apparatus 400 includes the integral structure 450, of which the frame, the substrate and the partition are not engaged to each other, the durability of the distance measuring apparatus 400 is improved. Specifically, the integral structure 450 does not need to engage the frame with the substrate, and the partition with the substrate, thereby preventing mechanical drawback which may occur in the engaged portion of each component.

Also, In the case where the distance measuring apparatus 400 includes the integral structure 450, it is possible to easily adjust focus alignment between the second optical element 140 and the light receiving element 120. For example, in the case of configuring the distance measuring apparatus, of which the frame is engaged with the substrate, and the partition is engaged with the substrate, the focus distance between the second optical element 140 and the light receiving element 120 may deviate from a predetermined value in the process of engaging the respective components, due to variations in volume of an adhesive for fixing the frame and the substrate. However, in the case where the distance measuring apparatus 400 includes the integral structure 450, the process of engaging the frame, the substrate, and the partition is not needed, thereby accurately aligning the focus distance.

Figure 8:
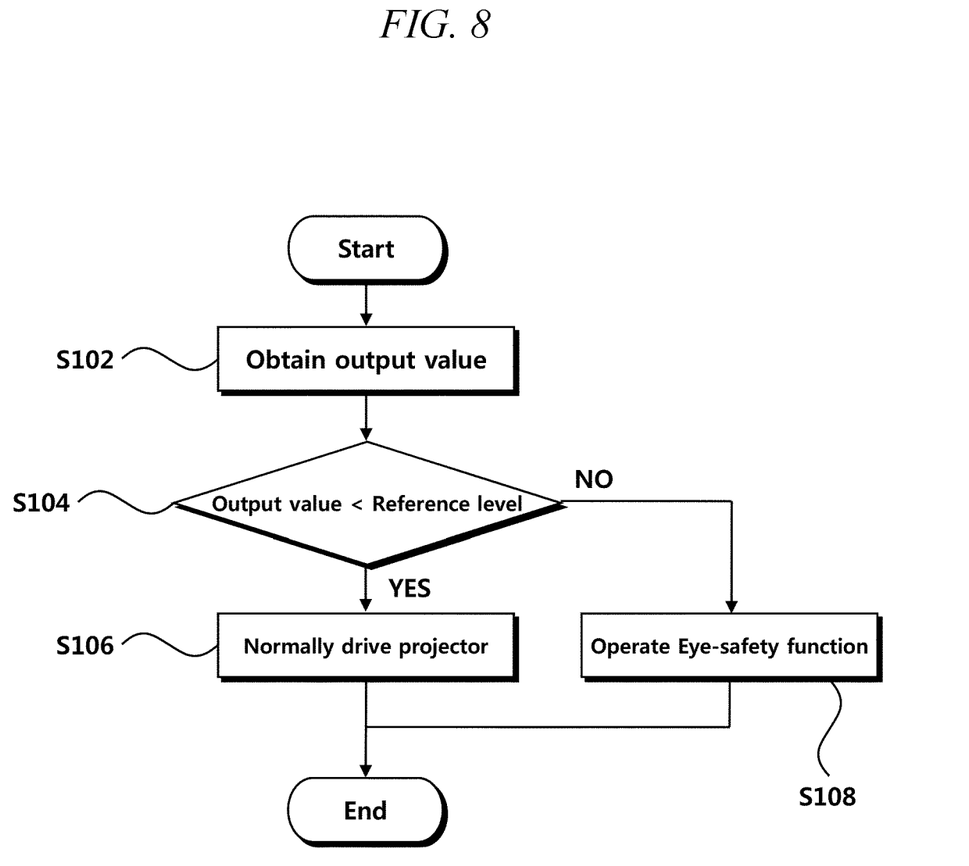
FIG. 8 is a flow chart illustrating a process of changing an operation mode of a distance measuring module of the present disclosure according to an output value.

FIG. 8 is a flow chart illustrating a process of changing the operation mode of the distance measuring module of the present disclosure according to the output value.

Referring to FIG. 8, the processor obtains the output value from the light source (S102). The output value may be energy to be consumed by the light source.

The processor determines whether or not the measured output value is lower than a reference output value (S104).

If the output value is lower than the reference output value, the processor operates the light source in the normal mode (S106). If the output value is higher than the reference output value, the processor operates the light source in the eye-safety mode (S108). In the eye-safety mode, the processor may turn the light source off, or may decrease the supply of electricity to the light source.

Figure 9:
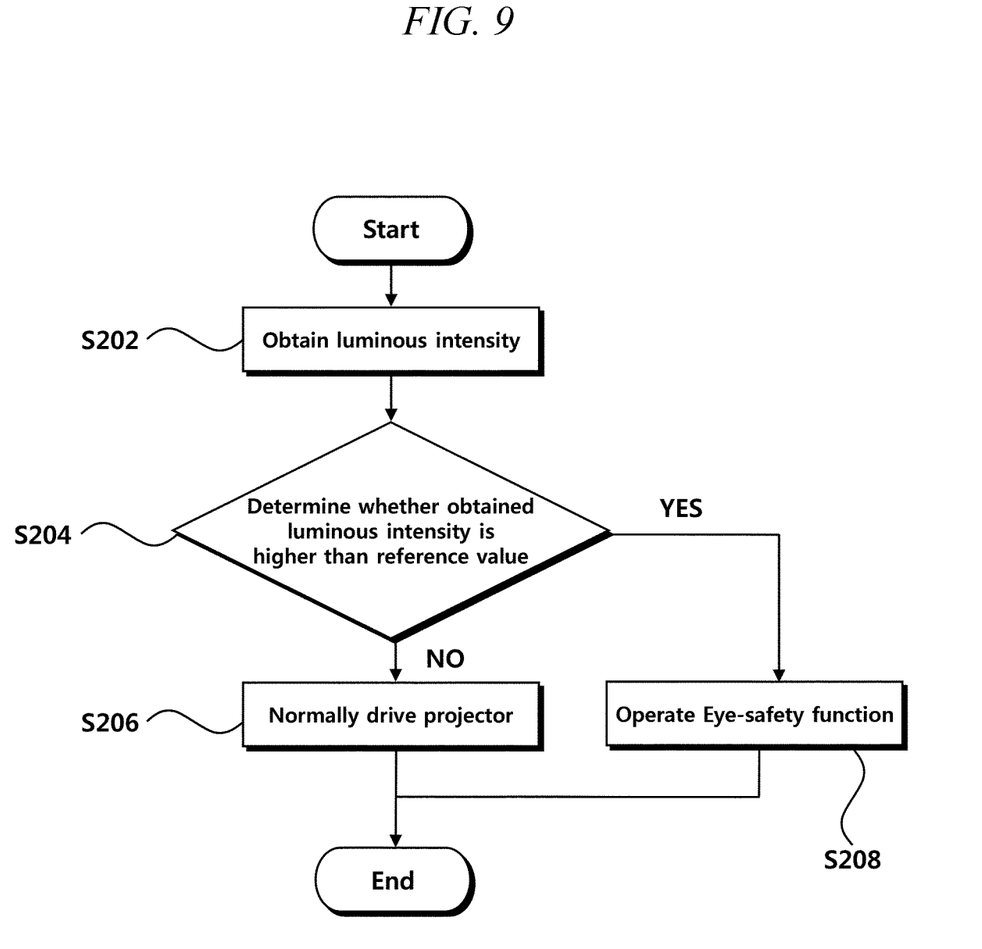
FIG. 9 is a flow chart illustrating a process of changing an operation mode of a distance measuring module of the present disclosure according to the obtained luminous intensity.

FIG. 9 is a flow chart illustrating a process of changing the operation mode of the distance measuring module of the present disclosure according to the obtained luminous intensity.

Referring to FIG. 9, the processor obtains the luminous intensity of the light by the photosensitive element (S202). Herein, the luminous intensity of the light may be the luminous intensity of the light emitted from the light source and returned to the first optical element.

The processor determines whether or not the measured luminous intensity of the light is higher than a reference value (S204).

If the luminous intensity of the light is within the reference value, the processor operates the light source in the normal mode (S206). If the luminous intensity is out of the reference value, the processor operates the light source in the eye-safety mode (S208). In the eye-safety mode, the processor may turn the light source off, or may decrease the supply of electricity to the light source.

As described above, the distance measuring apparatus according to these embodiments can protect the user's eyes even in the case where there is something wrong with the distance measuring apparatus.

Also, with the distance measuring apparatus according to the embodiments, it is possible to decrease the data loss between the light source and the processor, and reduce the power consumption, as well as achieving the precise data transmission.

Since terms, such as "including," "comprising," and "having" mean that corresponding elements may exist unless they are specifically described to the contrary, it shall be construed that other elements can be additionally included, rather than that such elements are omitted. All technical, scientific or other terms are used consistently with the meanings as understood by a person skilled in the art unless defined to the contrary. Common terms as found in dictionaries should be interpreted in the context of the related technical writings, rather than overly ideally or impractically, unless the present disclosure expressly defines them so.

Although a preferred embodiment of the present disclosure has been described for illustrative purposes, those skilled in the art will appreciate that various modifications, additions and substitutions are possible, without departing from the scope and spirit of the embodiment as disclosed in the accompanying claims. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A distance measuring apparatus comprising:
    a light source configured to emit a light;
    a first optical element, configured to decrease intensity of the light emitted from the light source, through which the light emitted from the light source penetrates;
    a light receiving element configured to receive the light emitted from the light source toward a predetermined space and reflected back from an object;
    a substrate configured to support the light source and the light receiving element;
    a second optical element which is disposed in a higher position than that of the light receiving element to collect the light reflected back from the object and through which the light is reflected back from the object penetrates;
    a frame which is disposed to be connected to the substrate and spaces the first optical element and the second optical element apart from the light source and the light receiving element by a predetermined distance;
    a partition which is disposed between the light source and the light receiving element to form a first cavity on a side of the light source and a second cavity on a side of the light receiving element in cooperation with the frame; and
    a processor, configured to monitor and control an output of the light source, which is disposed on a surface of the substrate opposite the surface on which the light source is disposed and electrically connected to the light source via the substrate.

2. The distance measuring apparatus according to claim 1, wherein the processor operates an eye-safety mode to restrict the output of the light source if an output value of the light source deviates from a reference level.

3. The distance measuring apparatus according to claim 1, further comprising a photosensitive element which is disposed on the substrate to measure the luminous intensity of the light reflected back from the first optical element.

4. The distance measuring apparatus according to claim 3, wherein the processor operates an eye-safety mode to restrict the output of the light source if the light measured by the photosensitive element is out of a predetermined reference level.

5. The distance measuring apparatus according to claim 1, wherein the substrate includes a first substrate and a second substrate, the light source and the processor are disposed on the first substrate, and the light receiving element is disposed on the second substrate.

6. The distance measuring apparatus according to claim 1, wherein the frame, the partition, and the substrate comprise ceramic.

7. The distance measuring apparatus according to claim 6, wherein the ceramic is a low temperature co-fired ceramic.

8. The distance measuring apparatus according to claim 1, wherein the processor is electrically connected to the light source through a via-fill formed inside the substrate.

9. The distance measuring apparatus according to claim 1, wherein an inner surface of the frame and an outer surface of the partition are provided with a metallic ground.

10. The distance measuring apparatus according to claim 1, wherein the second optical element includes an infrared filter.

11. The distance measuring apparatus according to claim 1, wherein the light source includes a vertical-cavity surface-emitting layer (VCSEL) and the first optical element includes a diffuser for diffusing the light.

12. A distance measuring apparatus comprising:
 a light source configured to emit a light;
 a first optical element, configured to decrease intensity of the light emitted from the light source, through which the light emitted from the light source penetrates;
 a light receiving element configured to receive the light emitted from the light source toward a predetermined space and reflected back from an object;
 a second optical element, which is disposed in a higher position than that of the light receiving element to collect the light reflected back from the object and through which the light is reflected back from the object penetrates;
 a structure configured to space the first optical element from the light source and the second optical element apart from the light receiving element by a predetermined distance, to support these elements, and to form a first cavity on a side of the light source and a second cavity on a side of the light receiving element so as to space the light source and the light receiving element from each other by a predetermined distance; and
 a processor, configured to monitor and control an output of the light source, which is disposed on a surface of the structure opposite the surface on which the light source is disposed and electrically connected to the light source via the structure.

13. The distance measuring apparatus according to claim 12, wherein the processor operates an eye-safety mode to restrict the output of the light source if an output value of the light source deviates from a reference level.

14. The distance measuring apparatus according to claim 13, further comprising a photosensitive element which is disposed on the substrate to measure the luminous intensity of the light reflected back from the first optical element.

15. The distance measuring apparatus according to claim 14, wherein the processor operates an eye-safety mode to restrict the output of the light source if the light measured by the photosensitive element deviates from a predetermined level.

16. The distance measuring apparatus according to claim 12, wherein the structure comprises ceramic.

17. The distance measuring apparatus according to claim 16, wherein the ceramic is a low temperature co-fired ceramic.

18. The distance measuring apparatus according to claim 12, wherein the processor is electrically connected to the light source through a via-fill formed in the structure.

19. The distance measuring apparatus according to claim 12, wherein an inner surface of the structure is provided with a metallic ground.

* * * * *